Figure 1:
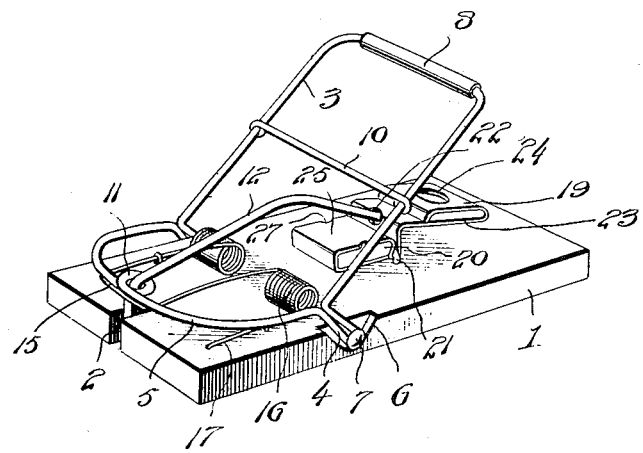

G. A. JONES.
ANIMAL TRAP.
APPLICATION FILED SEPT. 17, 1913.

1,118,287.

Patented Nov. 24, 1914.

Witnesses

Inventor
G. A. Jones
By E. B. Stocking
Attorney

UNITED STATES PATENT OFFICE.

GEORGE AUGUSTUS JONES, OF UNIVERSITY PLACE, NEBRASKA.

ANIMAL-TRAP.

1,118,287.   Specification of Letters Patent.   Patented Nov. 24, 1914.

Application filed September 17, 1913. Serial No. 790,298.

*To all whom it may concern:*

Be it known that I, GEORGE AUGUSTUS JONES, a citizen of the United States, residing at University Place, in the county of Lancaster and State of Nebraska, have invented certain new and useful Improvements in Animal-Traps, of which the following is a specification, reference being had therein to the accompanying drawing.

This invention relates to certain new and useful improvements in animal traps and more particularly to what is known as mouse traps; the object being to provide a trap which is so constructed that the same can be readily set by exerting a pressure upon one end of the jaw, the trigger and bait holder being so mounted in respect to each other that when the jaw is thrown into raised position, it will be automatically held, thereby overcoming the difficulties now existing with traps of this kind in setting the same by manipulating the bait holder and trigger separately.

Another and further object of the invention is to provide a trap which is exceedingly simple and cheap in construction; the parts being so arranged and mounted upon a suitable base that all danger of the jaw, trigger and bait holder getting out of order is abolished and a trap is formed which can be readily set and emptied by simply exerting a pressure upon one end of the jaw.

Another and further object of the invention is to provide a novel bait holder provided with a pocket to receive the bait in order to prevent the animal from removing the bait therefrom, thereby enabling a piece of bait to be used continuously; the same being held in such position that when the mouse attempts to remove the same from the pocket, the trigger will be tripped and the jaw will be thrown by spring pressure over the neck of the mouse in order to choke the same, and while I have used the term "mouse trap" in connection with this device, it is of course understood that the same can be used for catching various other forms of animals and I do not wish to limit myself to the use of the trap, in any way.

Another and further object of the invention is to provide a jaw in the form of a frame, one end portion of which is bent upwardly obliquely having a central guide eye for the trigger; said oblique portion forming a handle which is adapted to be pressed downwardly by exerting a pressure thereon with the thumb; the base being grasped by the hand so as to raise the jaw and depress the trigger so that it will be engaged by the pivoted bait holder in order to hold the jaw in set position so that when the bait holder is tripped by the animal, the jaw will be released.

Other and further objects and advantages of the invention will be hereinafter set forth and the novel features thereof defined by the appended claims.

Figures 2, 3, 4, 5:
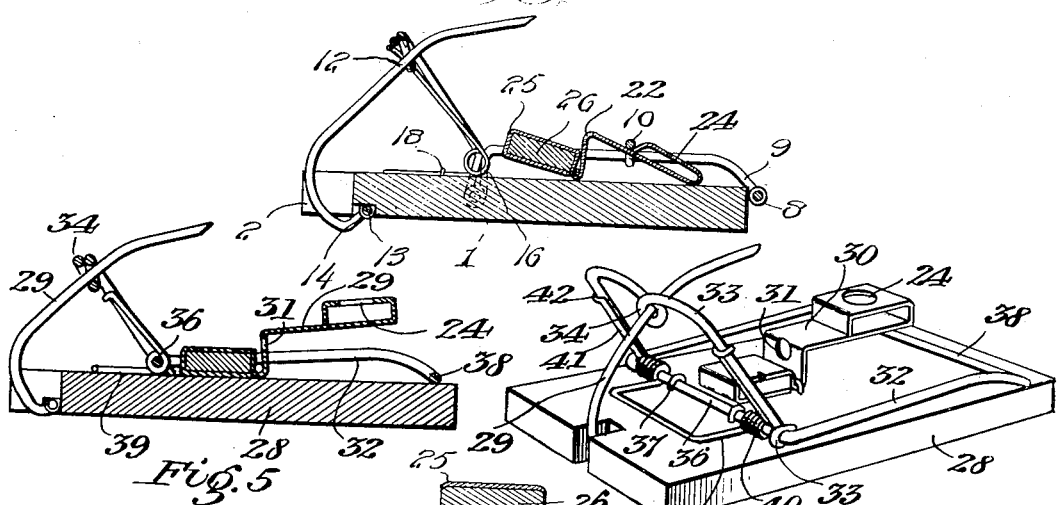

In the drawings—Figure 1, is a perspective of my mouse trap showing the same in set position; Fig. 2, is a longitudinal vertical section through the same, showing the same in sprung position; Fig. 3, is a detail section through the bait holder, showing the manner of securing the weight in position therein; Fig. 4, is a perspective of a slightly modified form of trap showing the jaw in sprung position; and Fig. 5, is a longitudinal vertical section through Fig. 4.

Like numerals of reference refer to like parts in the several figures of the drawings.

In carrying out my invention, I employ a rectangular base 1 which is preferably formed of wood and is provided with a notch 2 at one end, for the purpose to be hereinafter described, and while I have shown this base rectangular in form, it is of course understood that the same can be formed of any configuration desired and of any material, such as metal.

Mounted upon the base 1 is a jaw 3 which is preferably formed of a rectangular frame; the side bars thereof being bent to form eyes 4 adjacent one end; the end portion thereof 5, being bent upwardly obliquely to form a handle; said eyes 4 being pivotally mounted in recesses 6 formed in the sides of the base 1 upon pivots 7 as clearly shown in Fig. 1 in order to allow the jaw to swing freely as will be later described.

The jaw 3 is provided with a sleeve 8 at its end and at this point is slightly depressed as shown at 9 so as to extend over the end of the base 1 as clearly shown in Fig. 2 and the side bars of the jaw are connected together by a cross bar 10 which extends across the frame at such a point that if the animal is not caught by the sleeve 8, it will be caught by the cross bar and while I have shown the jaw formed of a frame, it is of course understood that the same can be constructed of a sheet of metal bent into the desired shape having the portions cut out, but by constructing the same of a wire frame, the cost of manufacturing is reduced.

The handle portion 5 of the jaw 3 is provided with a centrally disposed depending eye 11 through which extends a pivotally mounted spring trigger 12 which is slightly bowed as shown and extends through the notch 2 and is provided with a laterally extending portion 13 which is mounted in eyes 14 secured in a recess formed in the under side of the base 1, as clearly shown in Fig. 2 in order to allow the trigger to swing upon its pivot when the handle is depressed.

In order to provide means for spring-actuating the jaw so as to force the same into engagement with the base, I provide a substantially U-shaped spring 15 which embraces the depending eye 11 of the handle and is provided with coils 16 having rearwardly projecting ends 17 which are secured upon the base by staples 18.

Pivotally mounted upon the base 1 under the jaw 3 is a bait holder 19 which is preferably formed of a strip of metal bent to form an eye 20 which is pivotally mounted upon a staple pivot 21 secured in the base and is provided with an upwardly projecting portion having an opening 22 to receive the free end of the trigger 12 when the same is forced downwardly by exerting a pressure upon the handle so as to set the jaw and hold the same in that position until it has been tripped by the animal attempting to remove the bait from the holder.

The bait holder 19 is provided with a pocket 23, in which the bait is placed, having an opening 24 in its top through which the bait is visible in order to attract the animal thereto and the ends of the pockets are open also for this purpose. The bait holder is provided with a rearwardly extending portion formed in the shape of a pocket 25 in which a weight 26 is placed for normally holding the bait pocket in raised position and for securing the weight 26 within the pocket 25, I form indentations 27 in the edge of the pocket which securely holds the weight therein. By this construction, the bait holder is normally held in such a position, that when the trigger is depressed by the handle, the free end thereof is forced into the opening 22 of the bait holder so that when the handle is released, the trigger is held by the bait holder which in turn holds the jaw in set-up position until the bait portion of the bait holder has been depressed by the weight of an animal attempting to remove the bait therefrom when the jaw will be released and forced downwardly by the spring so as to catch the animal.

In the form shown in Figs. 4 and 5, a base 28 is employed constructed substantially as shown in Figs. 1, 2 and 3, having a notch through which the trigger 29 extends which is mounted substantially in the same manner as that disclosed in the preferred form of the invention. In these figures, a bait holder 30 is employed constructed identical to that in Fig. 2 having an opening 31 to receive the free end of the trigger 29. In this form of trap, the jaw is in the form of a frame comprising a jaw portion 32 and a handle portion 33 which is provided with a depending eye portion 34 through which the trigger 29 extends but instead of providing the side bars of the frame constituting the jaw and the handle, the depending pivoted eyes are dispensed with and eyes 35 formed at the junction thereof through which extends one end of the wire forming the frame which forms a cross bar 36 which is pivotally mounted in eyes 37 arranged upon the top of the base as clearly shown in Fig. 4 in order to allow the jaw to swing upwardly. In this form, the depending portion 38 of the jaw engages the top of the base 28 instead of passing over the end thereof.

By constructing the frame constituting the jaw and handle in this manner, the same can be formed out of a single piece of wire so as to provide a cross bar forming a pivot for the jaw.

In connection with the jaw, I employ a spring which is substantially U-shaped as shown at 39 and which normally rests upon the top of the base and is provided with coil portions 40 embracing the cross bar 36 having upwardly extending free ends 41 terminating in hook portions 42 which embrace the side bars of the handle so as to exert an upward pressure thereon which in turn throws the jaw downwardly into engagement with the base when the trigger is released by the animal stepping upon the bait holder.

While I have shown and described two forms of trap, the operation of both forms is identical, as each is provided with a spring-actuated jaw having an eye through which the trigger passes which in turn coöperates with the pivoted bait holder normally held in such position, that it will engage the trigger when the same is depressed.

By providing a trap with a spring-actuated jaw having a sliding connection with a trigger at a point to the rear of the fulcrum of said jaw, the free end of which coöperates with a pivoted bait holder, it is only necessary to depress the handle of the jaw in order to set the trap or empty the same, thereby overcoming the difficulties with traps of this character now in use.

The ends of the triggers 12 and 29 are beveled or cut off at an angle so as to form an inclined face which will strike the bait holder above the opening so as to press the holder down and allow the end to extend into the opening formed therein so as to lock the jaw in set position. While I have shown a wooden base for the formation of this trap, it is of course understood that a metal base could be employed without departing from the spirit of my invention.

In the specification, I have described the bar 10 of the jaw frame performing the function of catching the animal, but it is of course understood that this bar also forms a guard so as to prevent the animal from approaching the trap from the rear, thereby preventing the trap from being sprung until the animal is under the jaw.

I claim:

1. In a trap, the combination with a base, of a spring-actuated jaw frame mounted upon said base having a rearwardly and upwardly extending handle portion, said handle portion having an eye, a pivoted spring trigger carried by said base extending through said eye to the rear of the fulcrum of said jaw, and a pivoted bait holder mounted to coöperate with said trigger for holding said jaw in raised position.

2. A trap, comprising a base, a jaw frame pivotally mounted upon said base having a rearwardly extending handle portion, said handle portion being provided with a centrally located depending eye, a pivoted spring trigger carried by said base extending through said eye to the rear of the fulcrum of said frame, and a pivoted bait holder adapted to be engaged by said trigger for holding said jaw in set-up position.

3. In a trap, the combination with a base provided with pivots, of a jaw frame provided with eyes mounted upon said pivots, said jaw frame having an integral obliquely arranged handle extending rearwardly therefrom, an eye formed on said handle, a pivoted spring trigger mounted in said base extending through said eye to the rear of the fulcrum of said jaw, a weight-operated bait holder pivotally mounted upon said base, said bait holder being provided with an opening to receive the free end of said trigger for holding said jaw in set-up position.

4. A trap, comprising a base, a jaw frame having an integral handle portion, eyes formed on said frame at the junction of said jaw and handle thereof, pivots mounted upon said base upon which said eyes are mounted, a spring coöperating with the handle for forcibly throwing said jaw into engagement with the base, said handle being provided with an eye, a pivoted spring trigger mounted in the under side of said base and extending through the notch thereof, said trigger passing through the eye of said handle to the rear of the fulcrum of said jaw, and a bait holder mounted upon said base coöperating with the free end of said trigger for holding said jaw in set-up position.

5. A trap, comprising a base, a spring-actuated jaw frame pivotally mounted upon said base having a rearwardly extending handle portion, a trigger carried by said base having a sliding connection with the handle portion of said jaw frame to the rear of the fulcrum of said jaw, and a movable bait holder mounted upon said base in alinement with said trigger and coöperating therewith for holding said jaw frame in set-up position.

6. A trap, comprising a base having a pivoted spring-actuated jaw frame mounted thereon, said jaw frame having a rearwardly extending handle portion, said base having a notch at its rear end, a trigger mounted in the under side of said base extending through said notch, an eye formed on the handle portion of said jaw to receive said trigger to the rear of the fulcrum of said jaw, and a pivoted weight-operated bait holder arranged in advance of said jaw upon said base having an opening to receive the end of said trigger.

In testimony whereof I affix my signature in presence of two witnesses.

GEORGE AUGUSTUS JONES.

Witnesses:
  HOMER A. FULLER,
  FRANK F. FULLER.